(12) United States Patent
Wu et al.

(10) Patent No.: US 11,381,436 B2
(45) Date of Patent: Jul. 5, 2022

(54) REFERENCE SIGNAL PATTERN TRANSMISSION METHOD AND APPARATUS THEREFOR

(71) Applicant: Huawei Technologies Co., Ltd., Shenzhen (CN)

(72) Inventors: Lu Wu, Shenzhen (CN); Yong Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 16/674,903

(22) Filed: Nov. 5, 2019

(65) Prior Publication Data

US 2020/0067751 A1 Feb. 27, 2020

Related U.S. Application Data

(63) Continuation of application No. PCT/CN2018/085515, filed on May 3, 2018.

(30) Foreign Application Priority Data

May 5, 2017 (CN) .......................... 201710314074.6

(51) Int. Cl.
*H04L 27/26* (2006.01)
*H04B 7/06* (2006.01)
(Continued)

(52) U.S. Cl.
CPC ....... *H04L 27/2613* (2013.01); *H04B 7/0626* (2013.01); *H04B 7/0689* (2013.01);
(Continued)

(58) Field of Classification Search
CPC . H04L 27/2613; H04L 5/0048; H04L 5/0007; H04L 5/0023; H04L 5/0094;
(Continued)

(56) References Cited

U.S. PATENT DOCUMENTS

2013/0196675 A1 8/2013 Xiao et al.
2014/0198683 A1 7/2014 Ihm et al.
(Continued)

FOREIGN PATENT DOCUMENTS

CN 101841354 A 9/2010
CN 102158292 A 8/2011
(Continued)

OTHER PUBLICATIONS

Ericcson: "On CSI-RS design", 3GPP R1-1702690 (Year: 2017).*
(Continued)

*Primary Examiner* — Justin T Van Roie
(74) *Attorney, Agent, or Firm* — Leydig, Voit & Mayer, Ltd.

(57) ABSTRACT

Embodiments of the present disclosure disclose a reference signal pattern transmission method and an apparatus therefor. The method includes: determining, a quantity N of symbols occupied by a CSI-RS resource, and N={1, 2, 4}; obtaining, a pattern of the CSI-RS resource; and sending, configuration information to a terminal device, N=1, the pattern of the CSI-RS resource occupies one RE in time domain, and occupies at least four consecutive REs in frequency domain; or N=2, the pattern of the CSI-RS resource occupies two consecutive REs in time domain, and occupies at least two consecutive REs in frequency domain; or N=4, the pattern of the CSI-RS resource occupies four consecutive REs in time domain, and occupies at least two consecutive REs in frequency domain. According to the embodiments of the present disclosure, a design of a pattern of a channel state information-reference signal resource in a 5G system can be implemented.

11 Claims, 12 Drawing Sheets

(51) Int. Cl.
H04L 5/00 (2006.01)
H04W 72/04 (2009.01)

(52) U.S. Cl.
CPC .......... *H04L 5/0048* (2013.01); *H04L 5/0007* (2013.01); *H04W 72/0446* (2013.01); *H04W 72/0453* (2013.01)

(58) Field of Classification Search
CPC ... H04L 5/0039; H04L 27/261; H04L 1/0026; H04L 5/0053; H04L 5/0057; H04L 5/0067; H04B 7/0626; H04B 7/0689; H04B 17/309; H04W 72/0446; H04W 72/0453; H04W 28/18
See application file for complete search history.

(56) References Cited

U.S. PATENT DOCUMENTS

| | | |
|---|---|---|
| 2014/0321306 A1 | 10/2014 | Nam et al. |
| 2015/0063241 A1 | 3/2015 | Shimezawa et al. |
| 2017/0126300 A1 | 5/2017 | Park et al. |
| 2018/0054290 A1* | 2/2018 | Park .................... H04L 5/005 |
| 2018/0102817 A1* | 4/2018 | Park .................... H04B 7/04 |
| 2018/0227095 A1 | 8/2018 | Tamrakar et al. |
| 2018/0234278 A1 | 8/2018 | Xu et al. |
| 2019/0268088 A1* | 8/2019 | Grant .................. H04B 7/0417 |

FOREIGN PATENT DOCUMENTS

| | | |
|---|---|---|
| CN | 102377531 A | 3/2012 |
| CN | 102469589 A | 5/2012 |
| CN | 102694622 A | 9/2012 |
| CN | 103825663 A | 5/2014 |
| CN | 104205970 A | 12/2014 |
| CN | 106411473 A | 2/2017 |
| CN | 106559162 A | 4/2017 |
| CN | 109687946 A | 4/2019 |
| CN | 109687947 A | 4/2019 |
| WO | 2014051374 A1 | 4/2014 |

OTHER PUBLICATIONS

Li Bing et al., "Research of Heterogeneous Networks Convergence with PDMA," Thesis for the Master Degree, total 55 pages (Feb. 28, 2017). With English abstract.

"NZP CSI-RS configuration and RE mapping for class A CSI reporting," 3GPP TSG RAN WG1 Meeting #82bis, Malmo, Sweden, R1-155483, pp. 1-8, 3rd Generation Partnership Project, Valbonne, France (Oct. 5-9, 2015).

Sunyue, "Research on channel estimation and pilot design in LTE-A system," Master Thesis, Beijing Jiaotong University, total 88 pages (Jul. 31, 2011). with English Abstract.

"On CSI-RS design," 3GPP TSG-RAN WG1 #88, Athens, Greece, R-1702690, pp. 1-9, 3rd Generation Partnership Project, Valbonne, France (Feb. 13-17, 2017).

* cited by examiner

REFERENCE SIGNAL PATTERN TRANSMISSION METHOD AND APPARATUS THEREFOR

CROSS-REFERENCE TO RELATED APPLICATIONS

This application is a continuation of International Application No. PCT/CN2018/085515, filed on May 3, 2018, which claims priority to Chinese Patent Application No. 201710314074.6, filed on May 5, 2017. The disclosures of the aforementioned applications are hereby incorporated by reference in their entireties.

TECHNICAL FIELD

Embodiments of the present disclosure relate to the communications field, and in particular, to a reference signal pattern transmission method and an apparatus therefor.

BACKGROUND

For a frame structure in a Long Term Evolution (LTE) system, refer to FIG. 1. A radio frame is 10 ms, and includes 10 sub-frames whose sub-frame indexes are 0 to 9. Each sub-frame is 1 ms, and one sub-frame is further divided into two slots. In a normal cyclic prefix (CP) mode, each slot has seven orthogonal frequency division multiplexing (OFDM) symbols whose symbol indexes are I=0 to I=6. The system performs resource allocation by allocating resource blocks (RB), and different quantities of RBs are correspondingly allocated for different bandwidths. Usually, one RB includes a time domain resource occupied by one slot in a time dimension, and usually includes a resource occupied by 12 subcarriers in a frequency domain dimension. A subcarrier spacing is 15 kHz. A resource occupied by one subcarrier in one OFDM symbol is referred to as a resource element (RE).

In the LTE system, a terminal device may perform measurement based on resource configuration information of a channel state information-reference signal (CSI-RS) that is delivered by a base station, obtain channel state information (CSI), and feed back at least one of parameters such as a channel quality indicator (CQI), a rank indicator (RI), and a precoding matrix indicator (PMI) to the base station. In the LTE system, the CSI-RS may support a maximum of eight logical ports.

However, in a 5th generation (5G) system, the CSI-RS can support no fewer than eight ports. A design of a CSI-RS pattern in the LTE system is not applicable to 5G. The design of the CSI-RS pattern is a key problem for 5G systems.

SUMMARY

A technical problem that needs to be resolved in embodiments of the present disclosure is to provide a reference signal pattern transmission method and an apparatus therefor, to implement a design of a pattern of a channel state information-reference signal resource in a 5G system.

According to a first aspect, an embodiment of the present disclosure provides a reference signal pattern transmission method, including: determining, by a network device, a quantity N of symbols occupied by a channel state information-reference signal (CSI-RS) resource, where N is a positive integer, and N={1, 2, 4}; obtaining, by the network device, a pattern of the CSI-RS resource based on the quantity N of symbols; sending, by the network device, configuration information corresponding to the pattern of the CSI-RS resource to a terminal device; receiving, by the terminal device, the configuration information that corresponds to the pattern of the CSI-RS resource and that is sent by the network device; and determining, by the terminal device, the pattern of the CSI-RS resource based on the configuration information, where if N=1, the pattern of the CSI-RS resource occupies one resource element (RE) in time domain, and occupies at least four consecutive REs in frequency domain; or if N=2, the pattern of the CSI-RS resource occupies two consecutive REs in time domain, and occupies at least two consecutive REs in frequency domain; or if N=4, the pattern of the CSI-RS resource occupies four consecutive REs in time domain, and occupies at least two consecutive REs in frequency domain.

After the quantity N of symbols occupied by the CSI-RS resource is determined, the pattern of the CSI-RS resource is obtained based on the quantity N of symbols, thereby implementing a design of a pattern of a channel state information-reference signal resource in a 5G system. Different patterns of CSI-RS resources are obtained by using different values of N, thereby flexibly implementing the design of the pattern of the CSI-RS resource.

In a possible implementation, if N=1, frequency-domain splicing is performed by using a first basic pattern (4, 1), to obtain the pattern of the CSI-RS resource, where the first basic pattern (4, 1) occupies one RE in time domain, and occupies four consecutive REs in frequency domain.

In a possible implementation, if N=2, frequency-domain splicing is performed by using a second basic pattern (2, 2), to obtain the pattern of the CSI-RS resource, where the second basic pattern (2, 2) occupies two consecutive REs in time domain, and occupies two consecutive REs in frequency domain.

In a possible implementation, if N=4, frequency-domain splicing is performed by using a second basic pattern (2, 4), to obtain the pattern of the CSI-RS resource, where the second basic pattern (2, 4) occupies two consecutive REs in time domain, and occupies four consecutive REs in frequency domain.

In a possible implementation, if N=1, a port quantity X of the CSI-RS resource={4, 8, 12}.

In a possible implementation, if N=2, a port quantity X of the CSI-RS resource={4, 8, 12, 16}.

In a possible implementation, if N=4, a port quantity X of the CSI-RS resource={16, 32}.

According to a second aspect, an embodiment of the present disclosure provides a network device. The network device has a function of implementing a behavior of the network device in the method according to the first aspect. The function may be implemented by hardware, or may be implemented by hardware executing corresponding software. The hardware or software includes one or more modules corresponding to the foregoing functions.

In a possible implementation, the network device includes a processing unit and a sending unit. The processing unit is configured to determine a quantity N of symbols occupied by a CSI-RS resource, where N is a positive integer, and N={1, 2, 4}. The processing unit is further configured to obtain a pattern of the CSI-RS resource based on the quantity N of symbols. The sending unit is configured to send configuration information corresponding to the pattern of the CSI-RS resource to a terminal device, where if N=1, the pattern of the CSI-RS resource occupies one RE in time domain, and occupies at least four consecutive REs in frequency domain; or if N=2, the pattern of the CSI-RS resource occupies two consecutive REs in time domain, and occupies at least two consecutive REs in frequency domain; or if N=4, the pattern of the CSI-RS resource occupies four consecutive REs in time domain, and occupies at least two consecutive REs in frequency domain.

In a possible implementation, the network device includes a processor and a transceiver. The processor is configured to determine a quantity N of symbols occupied by a CSI-RS resource, where N is a positive integer, and N={1, 2, 4}. The processor is further configured to obtain a pattern of the CSI-RS resource based on the quantity N of symbols. The transceiver is configured to send configuration information corresponding to the pattern of the CSI-RS resource to a terminal device, where if N=1, the pattern of the CSI-RS resource occupies one RE in time domain, and occupies at least four consecutive REs in frequency domain; or if N=2, the pattern of the CSI-RS resource occupies two consecutive REs in time domain, and occupies at least two consecutive REs in frequency domain; or if N=4, the pattern of the CSI-RS resource occupies four consecutive REs in time domain, and occupies at least two consecutive REs in frequency domain.

Based on a same disclosure conception, for a problem resolution principle and a beneficial effect of the network device, refer to the method according to the first aspect and a beneficial effect brought by the method. For implementation of the network device, refer to implementation of the method on a side of the network device according to the first aspect. Details are not described herein again.

According to a third aspect, an embodiment of the present disclosure provides a terminal device. The terminal device has a function of implementing a behavior of the terminal device in the method according to the first aspect. The function may be implemented by hardware, or may be implemented by hardware executing corresponding software. The hardware or software includes one or more modules corresponding to the foregoing functions.

In a possible implementation, the terminal device includes a receiving unit and a processing unit. The receiving unit is configured to receive configuration information that corresponds to a pattern of a CSI-RS resource and that is sent by a network device; and the processing unit is configured to determine the pattern of the CSI-RS resource based on the configuration information.

In a possible implementation, the terminal device includes a processor and a transceiver. The transceiver is configured to receive configuration information that corresponds to a pattern of a CSI-RS resource and that is sent by a network device; and the processor is configured to determine the pattern of the CSI-RS resource based on the configuration information.

Based on a same disclosure conception, for a problem resolution principle and a beneficial effect of the terminal device, refer to the method according to the first aspect and a beneficial effect brought by the method. For implementation of the terminal device, refer to implementation of the method on the terminal device side according to the first aspect. Details are not described herein again.

According to a fourth aspect, an embodiment of the present disclosure provides a computer readable storage medium, including an instruction. When the instruction runs on a computer, the computer is enabled to perform the method on a side of the network device according to the first aspect.

According to a fifth aspect, an embodiment of the present disclosure provides a computer readable storage medium, including an instruction. When the instruction runs on a computer, the computer is enabled to perform the method on the terminal device side according to the first aspect.

In the embodiments of the present disclosure, after the quantity N of symbols occupied by the CSI-RS resource is determined, the pattern of the CSI-RS resource is obtained based on the quantity N of symbols, thereby implementing the design of the pattern of the channel state information-reference signal resource in the 5G system. The different patterns of the CSI-RS resources are obtained by using the different values of N, thereby flexibly implementing the design of the pattern of the CSI-RS resource.

BRIEF DESCRIPTION OF DRAWINGS

To describe the technical solutions in the embodiments of the present disclosure or in the background more clearly, the following briefly describes the accompanying drawings used for describing the embodiments of the present disclosure or the background.

DESCRIPTION OF EMBODIMENTS

The following describes the embodiments of the present disclosure with reference to the accompanying drawings in the embodiments of the present disclosure.

Figure 1:
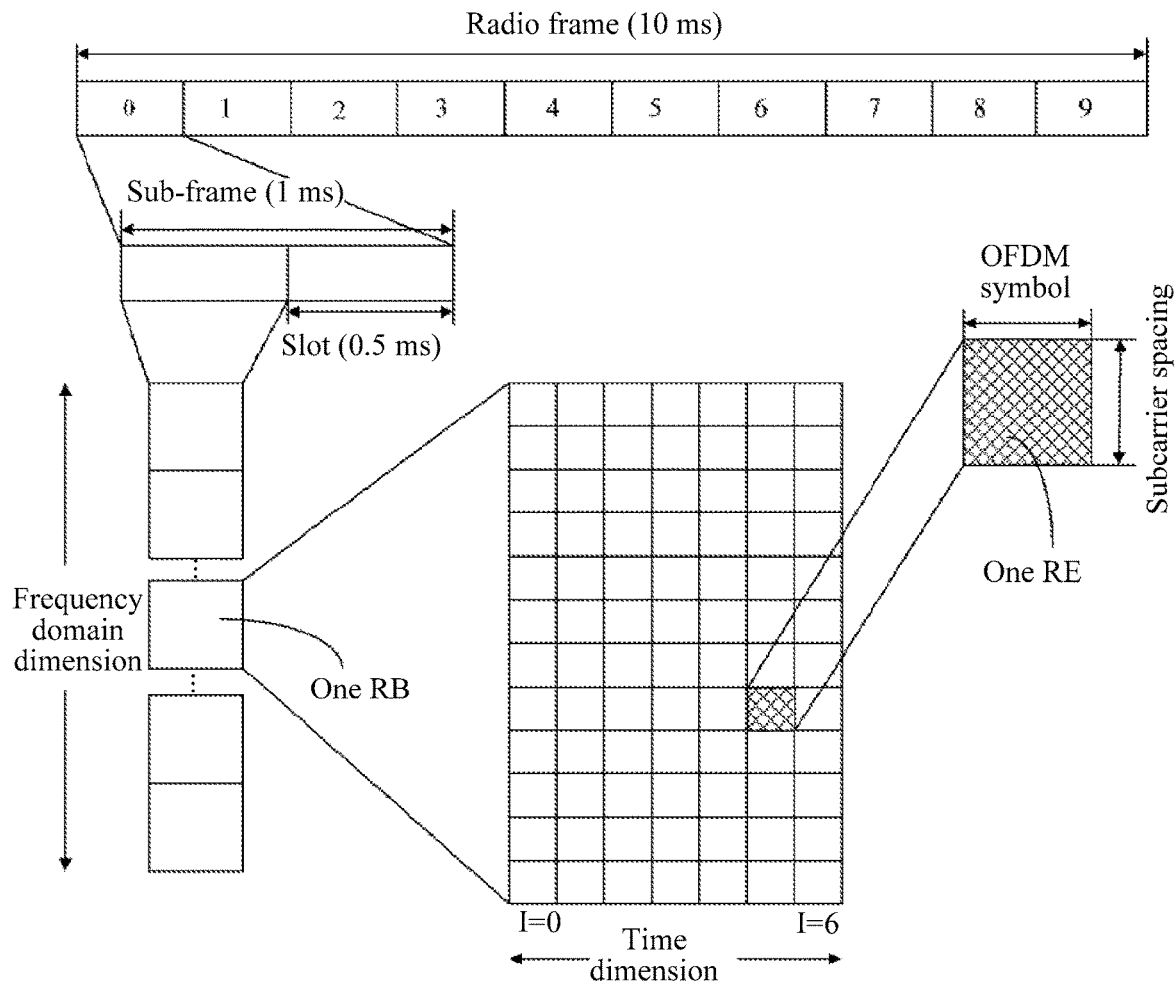
FIG. 1 shows a frame structure in an LTE system.
Figure 2:
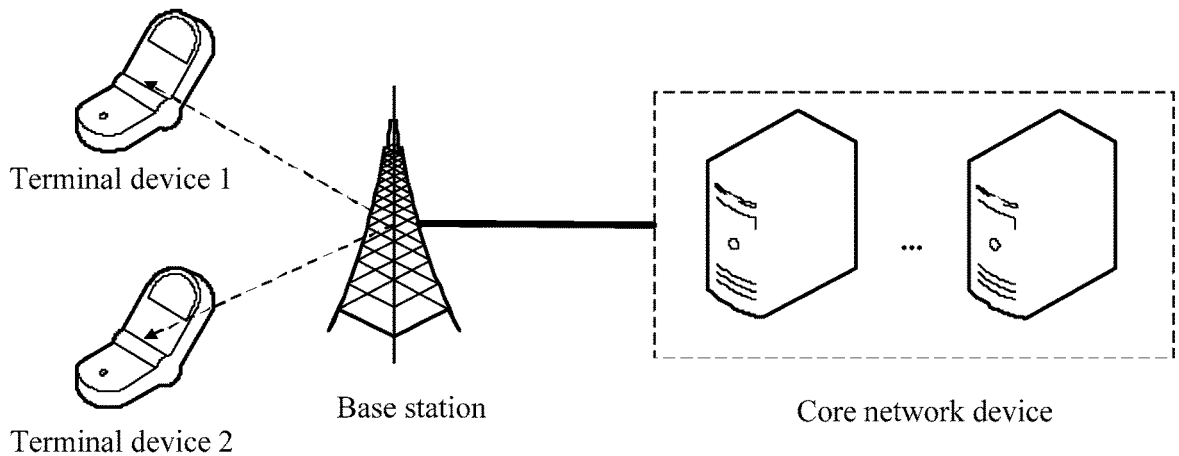
FIG. 2 is a schematic diagram of an application scenario according to an embodiment of the present disclosure.

The embodiments of the present disclosure may be applied to a wireless communications system. The wireless communications system usually includes cells. Each cell includes one base station (BS). The base station provides a communication service to a plurality of terminal devices. The base station is connected to a core network device, as shown in FIG. 2. The base station includes a baseband unit (BBU) and a remote radio unit (RRU). The BBU and the RRU may be placed at different places. For example, the RRU is remotely deployed, and is placed in an open area without heavy traffic, and the BBU is placed in a central equipment room. The BBU and the RRU may alternatively be placed in a same equipment room. The BBU and the RRU may alternatively be different parts in a same rack.

It should be noted that, the wireless communications system provided in the embodiments of the present disclosure includes but is not limited to: a narrowband Internet of Things (NB-IoT) system, a Global System for Mobile Communications (GSM), an Enhanced Data rates for GSM Evolution system (EDGE) system, Wideband Code Division Multiple Access (WCDMA) system, Code Division Multiple Access 2000 system (CDMA2000) system, a Time Division-Synchronous Code Division Multiple Access system (TD-SCDMA) system, a Long Term Evolution (LTE) system, a 5G system, and future mobile communications systems.

The base station in the embodiments of the present disclosure is an apparatus that is deployed in a radio access network and that is configured to provide a wireless communication function to a terminal device. The base station may include a macro base station, a micro base station (also referred to as a small cell), a relay station, an access point, Transmission and Reception Point (TRP) and the like in various forms. In systems that use different radio access technologies, names of a device that has a base station function may be different. For example, in an LTE system, the device is referred to as an evolved NodeB (eNB or eNodeB), and in a $3^{rd}$ generation (3G) system, the device is referred to as a NodeB (NB), or the like. For ease of description, in all the embodiments of the present disclosure, all the foregoing apparatuses that provide a wireless communication function to the terminal device are referred to as a network device.

The terminal device in the embodiments of the present disclosure may include various handheld devices, in-vehicle devices, wearable devices, or computing devices that have a wireless communication function, or other processing devices connected to a wireless modem. The terminal device may also be referred to as a mobile station (MS), a terminal, or may include a subscriber unit, a cellular phone, a smartphone, a wireless data card, a personal digital assistant (PDA) computer, a tablet computer, a wireless modem, a handset, a laptop computer, a machine type communication (MTC) terminal, and the like. For ease of description, in all the embodiments of the present disclosure, the aforementioned devices are collectively referred to as the terminal device.

In certain embodiments, one X-port CSI-RS resource is formed by splicing one or more basic patterns. A basic pattern (Y, Z) includes Y consecutive REs in frequency domain and Z consecutive REs in time domain in one RB. In a related standardization meeting, it is agreed that one two-port CSI-RS pattern includes two consecutive REs in one RB in one OFDM symbol, and is represented as (2, 1). One four-port CSI-RS pattern has two forms: One includes four consecutive REs in one RB in one symbol, namely, (4, 1); the other includes two consecutive REs in frequency domain and two consecutive REs in time domain in one RB, namely, (2, 2).

Figure 3:
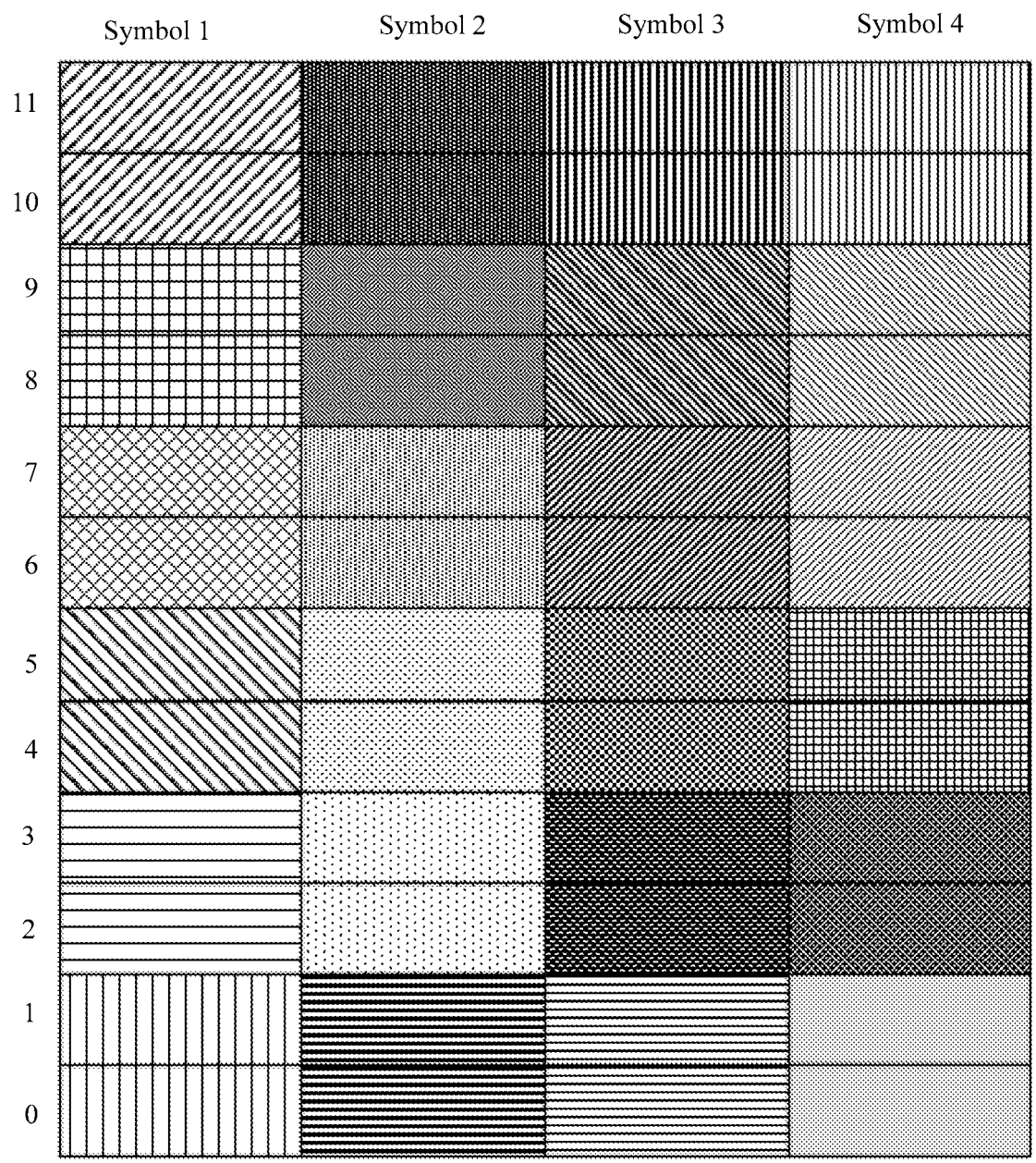
FIG. 3 is an example of a diagram of a current splicing solution based on a basic pattern (2, 1)

Currently, a solution in which a CSI-RS resource with any port quantity is formed by splicing a basic pattern (2, 1) is provided. Because there are 12 subcarriers in one RB, for the basic pattern (2, 1), there are six frequency domain positions in one RB. As shown in FIG. 3, using four consecutive symbols as an example, each type of shadow represents a time-frequency position in which one basic pattern may appear. One 6-bit (bit) sequence is defined to represent the six frequency domain positions, and if a value of a bit is 1, it indicates that a basic pattern occupies one position. Then, a frequency domain position of any CSI-RS resource may be indicated by using the 6-bit sequence. A time domain position of the CSI-RS resource needs to be indicated by using another K-bit sequence (K represents all quantities of OFDM symbols that may be occupied by the CSI-RS resource), and if a value of a bit is 1, it indicates that an OFDM symbol corresponding to the CSI-RS resource is occupied. Therefore, in this solution, a CSI-RS resource with any port quantity is indicated by using a (6+K)-bit sequence. Because splicing starts from a minimum splicing unit, namely, two REs, this solution can support any flexible combination, but has a disadvantage of high signaling overheads. In addition, four-port CSI-RS patterns are (4, 1) and (2, 2). To be specific, the four-port CSI-RS pattern includes consecutive REs in frequency domain/time domain, but is not formed by randomly combining basic patterns (2, 1). Therefore, the solution of splicing a basic pattern (2, 1) causes a redundant basic pattern and signaling overheads.

Figure 4:
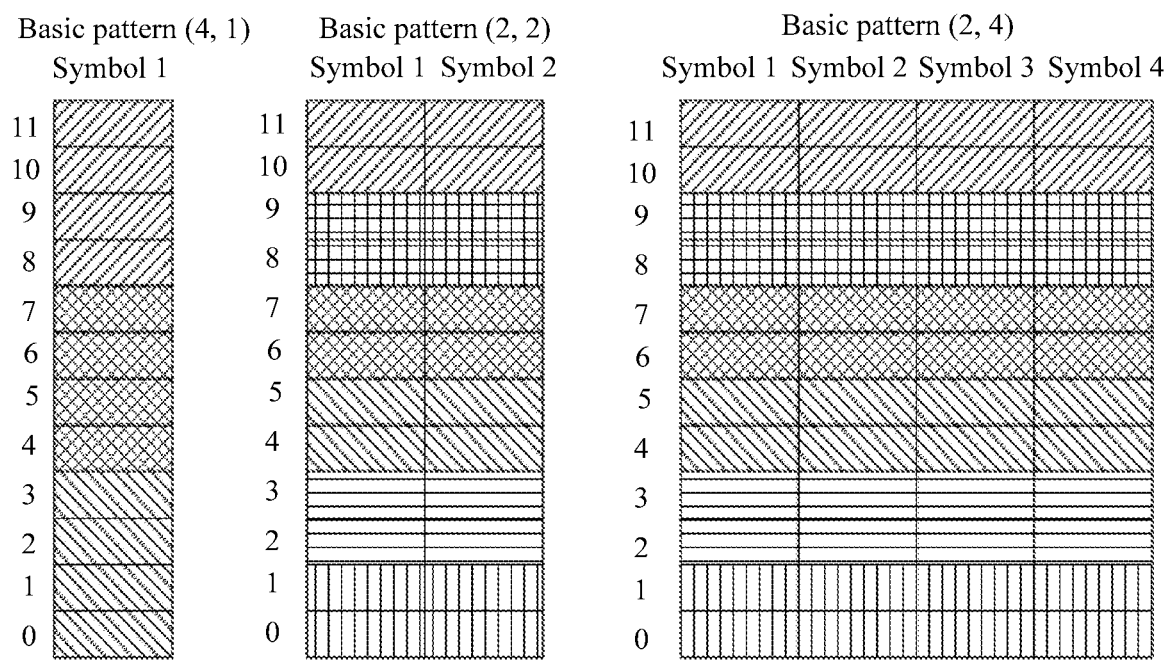
FIG. 4 is a schematic diagram of three types of basic patterns according to an embodiment of the present disclosure.

In view of the disadvantage of the solution of splicing a basic pattern (2, 1), the embodiments of the present disclosure provide three types of basic patterns (4, 1), (2, 2), and (2, 4) used to generate a pattern of a CSI-RS resource. Referring to FIG. 4, for the basic pattern (4, 1), there are three positions in which the basic pattern (4, 1) may appear in one RB in one symbol, and a position of one type of shadow may represent one basic pattern (4, 1). For the basic pattern (2, 2), there are six positions in which the basic pattern (2, 2) may appear in one RB in two symbols, and a position of one type of shadow may represent one basic pattern (2, 2). For the basic pattern (2, 4), there are six positions in which the basic pattern (2, 4) may appear in one RB in four symbols, and a position of one type of shadow may represent one basic pattern (2, 4). In the embodiments of the present disclosure, the pattern of the CSI-RS resource is obtained by using the basic pattern (4, 1), (2, 2), or (2, 4), so that not only a design of the pattern of the CSI-RS resource can be flexibly implemented, but also the redundant basic pattern caused by the solution of splicing a basic pattern (2, 1) can be prevented, and the signaling overheads can be reduced.

A reference signal pattern transmission method provided in the embodiments of the present disclosure is a method for generating a pattern of a channel state information-reference signal, is applied to the 5G system, and is mainly applied to a scenario in which a quantity of ports that can be supported by the channel state information-reference signal is greater than or equal to four in the 5G system.

In the embodiments of the present disclosure, when determining a quantity N of symbols occupied by the CSI-RS resource, the network device obtains, based on a value of N, patterns of CSI-RS resources corresponding to different symbol quantities. There may be a plurality of types of patterns of CSI-RS resources. Therefore, the network device may select one type of pattern from the patterns of the plurality of types of CSI-RS resources to perform resource configuration, and send resource configuration information to the terminal device. The terminal device performs measurement based on the resource configuration information, obtains CSI, and feeds back at least one of parameters such as a CQI, an RI, and a PMI to the network device.

According to the reference signal pattern transmission method and an apparatus therefor that are provided in the embodiments of the present disclosure, the design of the pattern of the CSI-RS resource in the 5G system can be implemented. Different patterns of CSI-RS resources are obtained by using different values of N, thereby flexibly implementing the design of the pattern of the CSI-RS resource.

Figure 5:
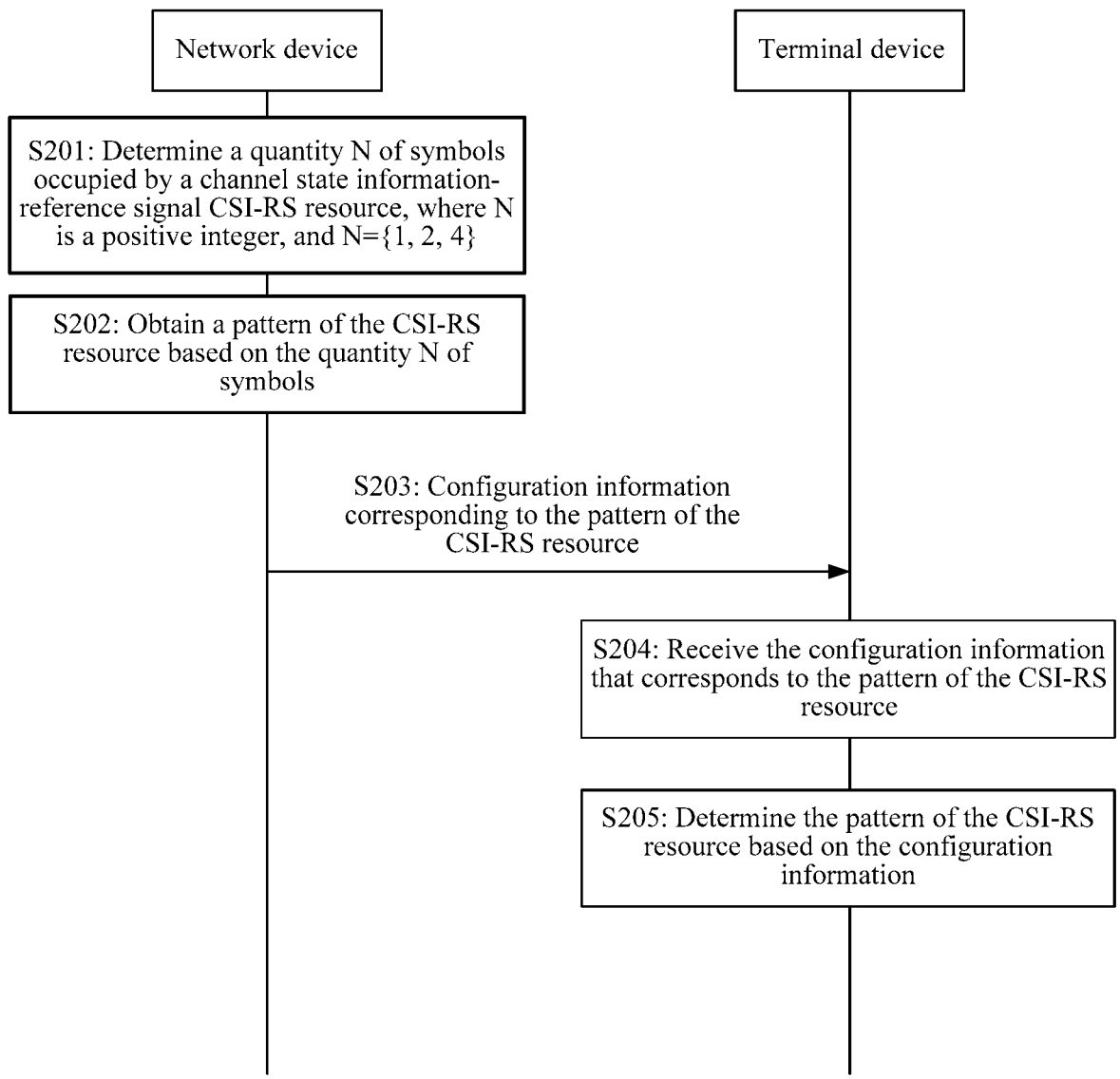
FIG. 5 is a schematic flowchart of a reference signal pattern transmission method according to an embodiment of the present disclosure.

FIG. 5 shows a reference signal pattern transmission method according to an embodiment of the present disclosure. Receiving is performed based on interaction between a network device and a terminal device. The method includes but is not limited to the following steps.

Step S201: The network device determines a quantity N of symbols occupied by a channel state information-reference signal (CSI-RS) resource.

Specifically, the network device determines the quantity N of symbols occupied by the CSI-RS resource. N is a positive integer, and N={1, 2, 4}, indicating that a value of N may be 1, 2, or 4. If N=1, it indicates that the CSI-RS resource occupies one symbol. If N=2, it indicates that the CSI-RS resource occupies two symbols. If N=4, it indicates that the CSI-RS resource occupies four symbols.

The network device may determine, based on a port quantity X of the CSI-RS resource, the quantity N of symbols occupied by the CSI-RS resource. If X=4, N=1 or 2. If X=8, N=1 or 2. If X=12, N=1 or 2. If X=16, N=2 or 4. If X=32, N=4.

Because one X corresponds to at least one N, for example, X=8, and N=1 or 2, the network device may select one N from at least one N, and configure the selected N in resource configuration information, so that the terminal device can learn of the quantity of symbols occupied by the CSI-RS resource. A method for selecting one N from at least one N by the network device is not limited in this embodiment of the present disclosure.

In conclusion, a relationship between the quantity N of symbols occupied by the CSI-RS resource and the port quantity X of the CSI-RS resource is as follows:
  if N=1, X={4, 8, 12};
  if N=2, X={4, 8, 12, 16}; or
  if N=4, X={16, 32}.

The quantity of symbols occupied by the CSI-RS resource may be a quantity of occupied OFDM symbols.

Step S202: The network device obtains a pattern of the CSI-RS resource based on the quantity N of symbols.

Specifically, if N=1, to be specific, the CSI-RS resource occupies one symbol, the network device may perform frequency-domain splicing by using a first basic pattern (4, 1), to obtain the pattern of the CSI-RS resource. Because the first basic pattern (4, 1) represents that one RE is occupied in time domain, and four REs are occupied in frequency domain, the pattern of the CSI-RS resource obtained by performing the frequency-domain splicing occupies one RE in time domain, and occupies at least four consecutive REs in frequency domain. For example, a pattern of an eight-port CSI-RS resource occupies one RE in time domain, and occupies eight consecutive REs in frequency domain. The network device may alternatively design the pattern of the CSI-RS resource in another manner, to obtain the pattern that is of the CSI-RS resource and that occupies one RE in time domain and at least four consecutive REs in frequency domain.

If N=2, to be specific, the CSI-RS resource occupies two symbols, the network device may perform frequency-domain splicing by using a second basic pattern (2, 2), to obtain the pattern of the CSI-RS resource. Because the second basic pattern (2, 2) represents that two REs are occupied in time domain, and two REs are occupied in frequency domain, the pattern of the CSI-RS resource obtained by performing the frequency-domain splicing occupies two REs in time domain, and occupies at least two consecutive REs in frequency domain. For example, a pattern of an eight-port CSI-RS resource occupies two REs in time domain, and occupies four consecutive REs in frequency domain. The network device may alternatively design the pattern of the CSI-RS resource in another manner, to obtain the pattern that is of the CSI-RS resource and that occupies two REs in time domain and at least two consecutive REs in frequency domain.

If N=4, to be specific, the CSI-RS resource occupies four symbols, the network device may perform frequency-domain splicing by using a third basic pattern (2, 4), to obtain the pattern of the CSI-RS resource. Because the third basic pattern (2, 4) represents that two REs are occupied in frequency domain, and four REs are occupied in time domain, the pattern of the CSI-RS resource obtained by performing the frequency-domain splicing occupies four REs in time domain, and occupies at least two consecutive REs in frequency domain. For example, a pattern of a 16-port CSI-RS resource occupies four REs in time domain, and occupies four consecutive REs in frequency domain. The network device may alternatively design the pattern of the CSI-RS resource in another manner, to obtain the pattern that is of the CSI-RS resource and that occupies four REs in frequency domain and at least two consecutive REs in time domain.

Step S203: The network device sends configuration information corresponding to the pattern of the CSI-RS resource to the terminal device.

Specifically, the configuration information corresponding to the pattern of the CSI-RS resource indicates one or more of a plurality of CSI-RS resources that are used by the network device, and further indicates that N=1, 2, or 4.

Step S204: The terminal device receives the configuration information that corresponds to the pattern of the CSI-RS resource and that is sent by the network device.

Step S205: The terminal device determines the pattern of the CSI-RS resource based on the configuration information.

Specifically, the terminal device determines the pattern of the CSI-RS resource based on the configuration information, to obtain the CSI-RS resource, thereby facilitating measurement.

In the embodiment described in FIG. 5, when determining the quantity N of symbols occupied by the CSI-RS resource, the network device designs the pattern of the CSI-RS resource based on the value of N, to obtain patterns of CSI-RS resources corresponding to different symbol quantities, so that a design of a pattern of a CSI-RS resource in a 5G system can be implemented, and the pattern of the CSI-RS resource can be flexibly implemented. The pattern of the CSI-RS resource is obtained by using the basic pattern (4, 1), (2, 2), or (2, 4), so that not only the design of the pattern of the CSI-RS resource can be flexibly implemented, but also a redundant basic pattern caused by a solution of splicing a basic pattern (2, 1) can be prevented, and signaling overheads can be reduced.

It should be noted that, in the embodiment described in FIG. 5, the descriptions are provided by using an example in which the quantity of symbols occupied by the CSI-RS resource is 1, 2, or 4. During actual application, a quantity of symbols that may be occupied by a CSI-RS resource is K, and extension of a pattern design solution may be performed based on a case in which the quantity of symbols is 1, 2, or 4.

The following describes design solutions for patterns of an eight-port CSI-RS resource, a 12-port CSI-RS resource, a 16-port CSI-RS resource, and a 32-port CSI-RS resource.

Eight-port CSI-RS resource:

(1) If N=1, frequency-domain splicing may be performed by using a basic pattern (4, 1). For the basic pattern (4, 1), there are three positions in which the basic pattern (4, 1) may appear in one RB in one symbol. Referring to FIG. 4, a pattern of the eight-port CSI-RS resource in the one symbol may be formed by splicing any two of the three basic patterns. Therefore, there are a total of $C_3^2=3$ types of patterns of the eight-port CSI-RS resource in the one symbol. Referring to an example of a diagram of patterns of the eight-port CSI-RS resource shown in FIG. 6a, a position of one type of shadow may represent one type of pattern of the eight-port CSI-RS resource.

It is assumed that a basic pattern (4, 1) that occupies subcarriers whose numbers are 0 to 3 in FIG. 4 is a basic pattern (a), a basic pattern (4, 1) that occupies subcarriers whose numbers are 4 to 7 in FIG. 4 is a basic pattern (b), and a basic pattern (4, 1) that occupies subcarriers whose numbers are 8 to 11 in FIG. 4 is a basic pattern (c).

Figure 6A:
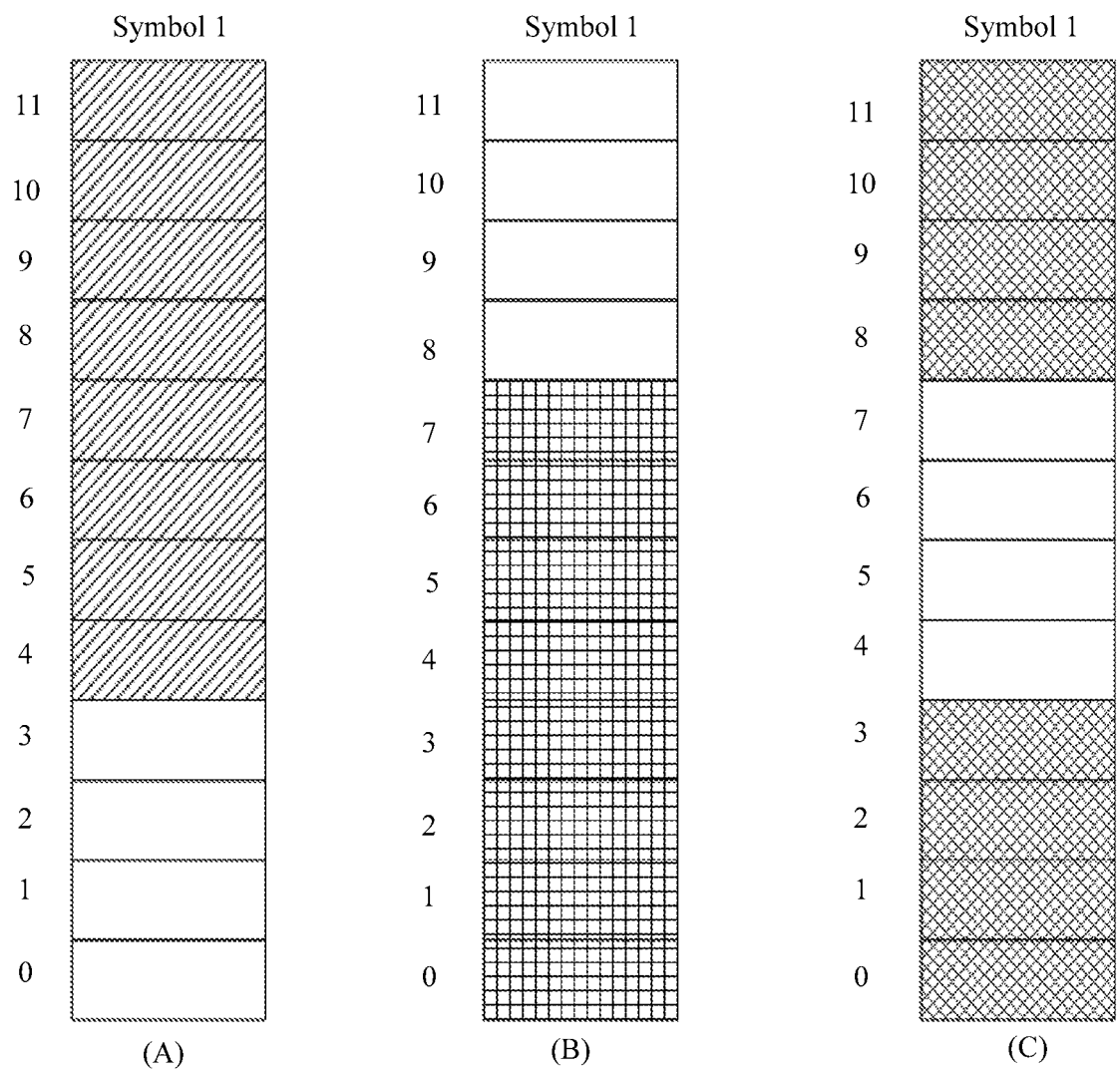
FIG. 6a is an example of a diagram of patterns of an eight-port CSI-RS resource when N=1 according to an embodiment of the present disclosure.

A pattern of the eight-port CSI-RS resource shown in (A) in FIG. 6a occupies one RE in time domain, and occupies eight consecutive REs in frequency domain. To be specific, the pattern of the eight-port CSI-RS resource is formed by splicing a basic pattern (b) and a basic pattern (c) that are adjacent to each other. A pattern of the eight-port CSI-RS resource shown in (B) in FIG. 6a occupies one RE in time domain, and occupies eight consecutive REs in frequency domain. To be specific, the pattern of the eight-port CSI-RS resource is formed by splicing a basic pattern (a) and a basic pattern (b) that are adjacent to each other. A pattern of the eight-port CSI-RS resource shown in (C) in FIG. 6a occupies one RE in time domain, and occupies two groups of four consecutive REs in frequency domain. To be specific, the pattern of the eight-port CSI-RS resource is formed by splicing a basic pattern (a) and a basic pattern (c) that are not adjacent to each other.

If a quantity of symbols that may be occupied by the eight-port CSI-RS resource is K, there are a total of $KC_3^2=3K$ types of patterns of the eight-port CSI-RS resource in the K symbols.

(2) If N=2, frequency-domain splicing may be performed by using a basic pattern (2, 2). There are six positions in which the basic pattern (2, 2) may appear in one RB in two symbols. Referring to FIG. 4, a pattern of the eight-port CSI-RS resource in the two symbols may be formed by splicing any two of the six basic patterns. Therefore, there are a total of $C_6^2=15$ types of patterns of the eight-port CSI-RS resource in the two symbols. Referring to an example of a diagram of patterns of the eight-port CSI-RS resource shown in FIG. 6b, two of 15 types are listed, and a position of one type of shadow may represent one type of pattern of the eight-port CSI-RS resource.

It is assumed that a basic pattern (2, 2) that occupies subcarriers whose numbers are 0 and 1 in FIG. 4 is a basic pattern (a), a basic pattern (2, 2) that occupies subcarriers whose numbers are 2 and 3 in FIG. 4 is a basic pattern (b), a basic pattern (2, 2) that occupies subcarriers whose numbers are 4 and 5 in FIG. 4 is a basic pattern (c), a basic pattern (2, 2) that occupies subcarriers whose numbers are 6 and 7 in FIG. 4 is a basic pattern (d), a basic pattern (2, 2) that occupies subcarriers whose numbers are 8 and 9 in FIG. 4 is a basic pattern (e), and a basic pattern (2, 2) that occupies subcarriers whose numbers are 10 and 11 in FIG. 4 is a basic pattern (f).

Figure 6B:
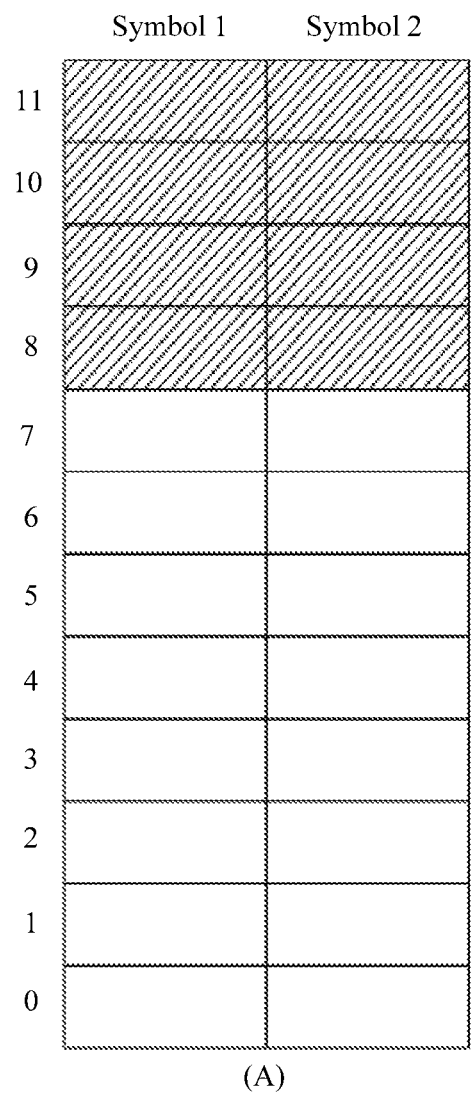
FIG. 6b is an example of a diagram of patterns of an eight-port CSI-RS resource when N=2 according to an embodiment of the present disclosure.
Figure 6B:
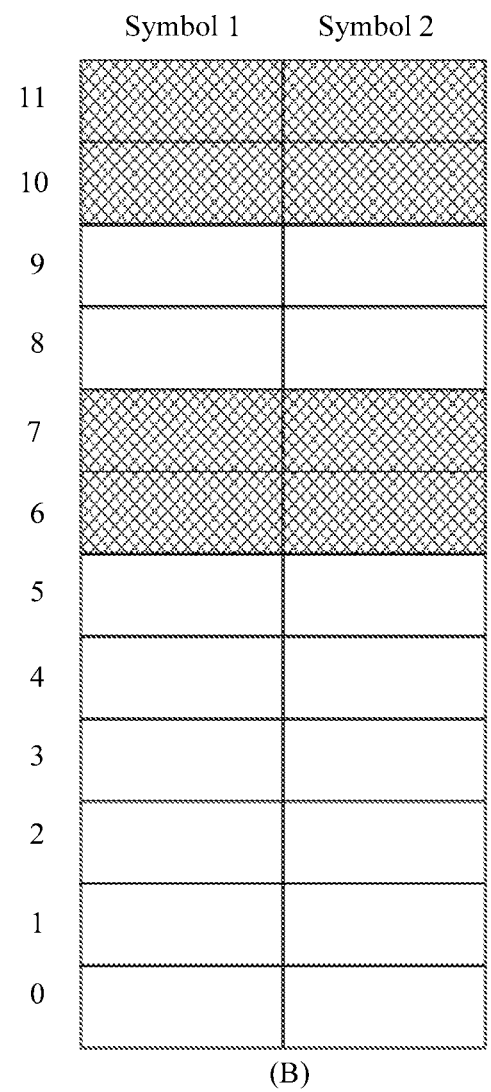

A pattern of the eight-port CSI-RS resource shown in (A) in FIG. 6b occupies two REs in time domain, and occupies four consecutive REs in frequency domain. To be specific, the pattern of the eight-port CSI-RS resource is formed by splicing a basic pattern (f) and a pattern (e) that are adjacent to each other. A pattern of the eight-port CSI-RS resource shown in (B) in FIG. 6b occupies two REs in time domain, and occupies two groups of two consecutive REs in frequency domain. To be specific, the pattern of the eight-port CSI-RS resource is formed by splicing a basic pattern (f) and a pattern (d) that are not adjacent to each other.

If a quantity of symbols that may be occupied by the eight-port CSI-RS resource is K, there are a total of $C_6^2K/2=15K/2$ types of patterns of the eight-port CSI-RS resource in the K symbols.

Figure 7A:
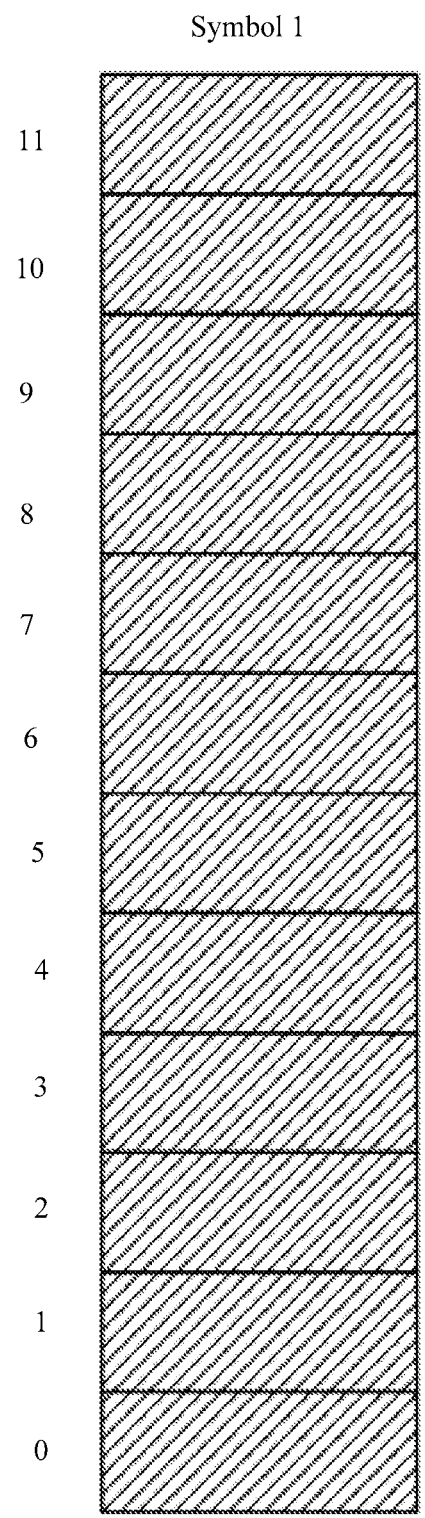
FIG. 7a is an example of a diagram of a pattern of a 12-port CSI-RS resource when N=1 according to an embodiment of the present disclosure.

12-port CSI-RS resource:

(1) If N=1, frequency-domain splicing may be performed by using a basic pattern (4, 1). There are three positions in which the basic pattern (4, 1) may appear in one RB in one symbol. Referring to FIG. 4, a pattern of the 12-port CSI-RS resource in one symbol may be formed by splicing the three basic patterns. Therefore, there is a total of one type of pattern of the 12-port CSI-RS resource in one symbol. Refer to an example of a diagram of the pattern of the 12-port CSI-RS resource shown in FIG. 7a.

If a quantity of symbols that may be occupied by the 12-port CSI-RS resource is K, there are a total of K types of patterns of the 12-port CSI-RS resource in the K symbols.

(2) If N=2, frequency-domain splicing may be performed by using a basic pattern (2, 2). There are six positions in which the basic pattern (2, 2) may appear in one RB in two symbols. Referring to FIG. 4, a pattern of the 12-port CSI-RS resource in the two symbols may be formed by splicing any three of the six basic patterns. Therefore, there are a total of $C_6^3=20$ types of patterns of the 12-port CSI-RS resource in the two symbols. Referring to an example of a diagram of patterns of the 12-port CSI-RS resource shown in FIG. 7b, three of 20 types are listed, and a position of one type of shadow may represent one type of pattern of the 12-port CSI-RS resource.

It is assumed that a basic pattern (2, 2) that occupies subcarriers whose numbers are 0 and 1 in FIG. 4 is a basic pattern (a), a basic pattern (2, 2) that occupies subcarriers whose numbers are 2 and 3 in FIG. 4 is a basic pattern (b), a basic pattern (2, 2) that occupies subcarriers whose numbers are 4 and 5 in FIG. 4 is a basic pattern (c), a basic pattern (2, 2) that occupies subcarriers whose numbers are 6 and 7 in FIG. 4 is a basic pattern (d), a basic pattern (2, 2) that occupies subcarriers whose numbers are 8 and 9 in FIG. 4 is a basic pattern (e), and a basic pattern (2, 2) that occupies subcarriers whose numbers are 10 and 11 in FIG. 4 is a basic pattern (f).

Figure 7B:
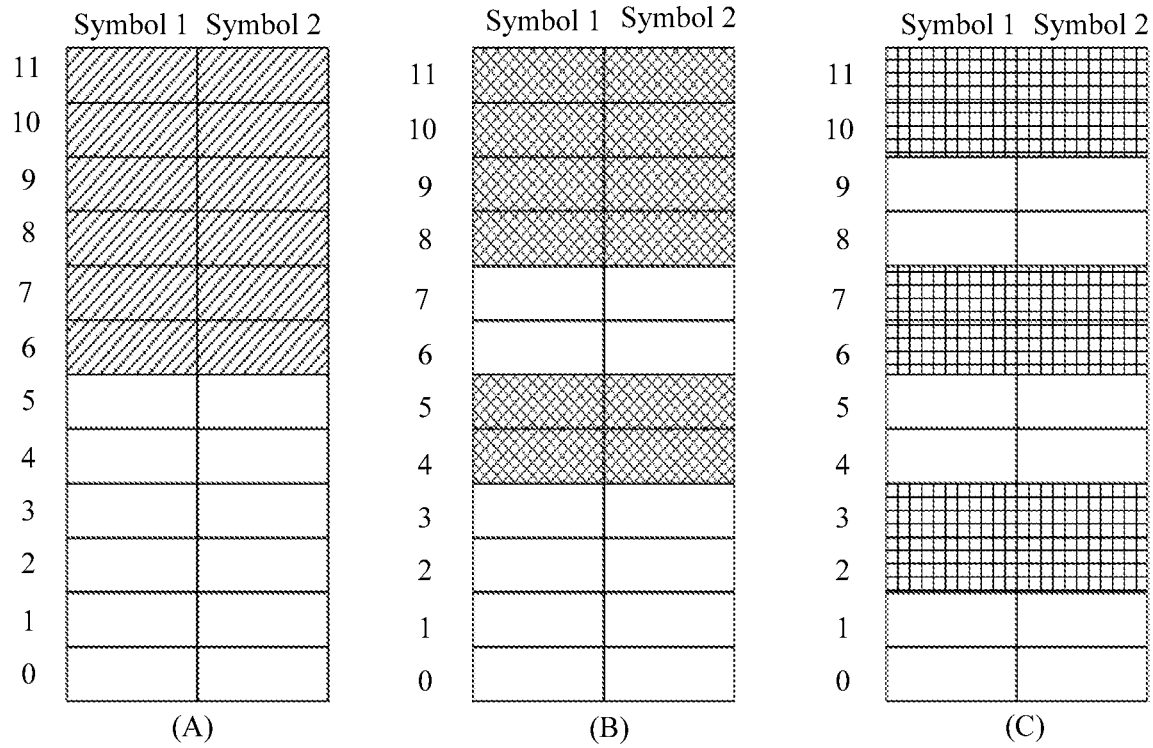
FIG. 7b is an example of a diagram of patterns of a 12-port CSI-RS resource when N=2 according to an embodiment of the present disclosure.

A pattern of the 12-port CSI-RS resource shown in (A) in FIG. 7b occupies two REs in time domain, and occupies six consecutive REs in frequency domain. To be specific, the pattern of the 12-port CSI-RS resource is formed by splicing a basic pattern (f), a basic pattern (e), and a basic pattern (d) that are adjacent to each other. A pattern of the 12-port CSI-RS resource shown in (B) in FIG. 7b occupies two REs in time domain, and occupies a group of four consecutive REs and a group of two consecutive REs in frequency domain. To be specific, the pattern of the 12-port CSI-RS resource is formed by splicing a basic pattern (c), and a basic pattern (f) and a basic pattern (e) that are adjacent to each other. A pattern of the 12-port CSI-RS resource shown in (C) in FIG. 7b occupies two REs in time domain, and occupies three groups of two consecutive REs in frequency domain. To be specific, the pattern of the 12-port CSI-RS resource is formed by splicing a basic pattern (f), a basic pattern (d), and a basic pattern (b) that are not adjacent to each other.

If a quantity of symbols that may be occupied by the 12-port CSI-RS resource is K, there are a total of $C_6^3 K/2 = 10K$ types of patterns of the 12-port CSI-RS resource in the K symbols.

16-port CSI-RS resource:

(1) If N=2, frequency-domain splicing may be performed by using a basic pattern (2, 2). There are six positions in which the basic pattern (2, 2) may appear in one RB in two symbols. Referring to FIG. 4, a pattern of the 16-port CSI-RS resource in the two symbols may be formed by splicing any four of the six basic patterns. Therefore, there are a total of $C_6^4 = 15$ types of patterns of the 16-port CSI-RS resource in the two symbols. Referring to an example of a diagram of patterns of the 16-port CSI-RS resource shown in FIG. 8a, four of 20 types are listed, and a position of one type of shadow may represent one type of pattern of the 16-port CSI-RS resource.

It is assumed that a basic pattern (2, 2) that occupies subcarriers whose numbers are 0 and 1 in FIG. 4 is a basic pattern (a), a basic pattern (2, 2) that occupies subcarriers whose numbers are 2 and 3 in FIG. 4 is a basic pattern (b), a basic pattern (2, 2) that occupies subcarriers whose numbers are 4 and 5 in FIG. 4 is a basic pattern (c), a basic pattern (2, 2) that occupies subcarriers whose numbers are 6 and 7 in FIG. 4 is a basic pattern (d), a basic pattern (2, 2) that occupies subcarriers whose numbers are 8 and 9 in FIG. 4 is a basic pattern (e), and a basic pattern (2, 2) that occupies subcarriers whose numbers are 10 and 11 in FIG. 4 is a basic pattern (f).

Figure 8A:
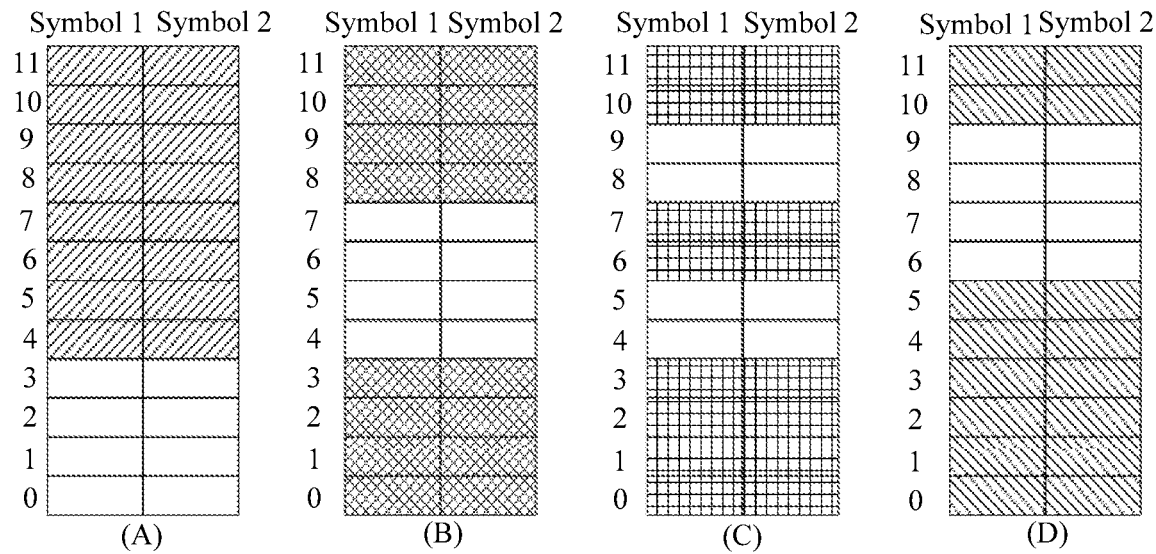
FIG. 8a is an example of a diagram of patterns of a 16-port CSI-RS resource when N=2 according to an embodiment of the present disclosure.

A pattern of the 16-port CSI-RS resource shown in (A) in FIG. 8a occupies two REs in time domain, and occupies eight consecutive REs in frequency domain. To be specific, the pattern of the 16-port CSI-RS resource is formed by splicing a basic pattern (f), a basic pattern (e), a basic pattern (d), and a basic pattern (c). A pattern of the 16-port CSI-RS resource shown in (B) in FIG. 8a occupies two REs in time domain, and occupies two groups of four consecutive REs in frequency domain. To be specific, the pattern of the 16-port CSI-RS resource is formed by splicing a basic pattern (f), a basic pattern (e), a basic pattern (b), and a basic pattern (a). A pattern of the 16-port CSI-RS resource shown in (C) in FIG. 8a occupies two REs in time domain, and occupies a group of four consecutive REs and two groups of two consecutive REs in frequency domain. To be specific, the pattern of the 16-port CSI-RS resource is formed by splicing a basic pattern (f), a basic pattern (d), a basic pattern (b), and a basic pattern (a). A pattern of the 16-port CSI-RS resource shown in (D) in FIG. 8a occupies two REs in time domain, and occupies a group of six consecutive REs and a group of two consecutive REs in frequency domain. To be specific, the pattern of the 16-port CSI-RS resource is formed by splicing a basic pattern (f), a basic pattern (c), a basic pattern (b), and a basic pattern (a).

If a quantity of symbols that may be occupied by the 16-port CSI-RS resource is K, there are a total of $C_6^4 K/2 = 15K/2$ types of patterns of the 16-port CSI-RS resource in the K symbols.

(2) If N=4, frequency-domain splicing may be performed by using a basic pattern (2, 4). There are six positions in which the basic pattern (2, 4) may appear in one RB in four symbols. Referring to FIG. 4, a pattern of the 16-port CSI-RS resource in the four symbols may be formed by splicing any two of the six basic patterns. Therefore, there are a total of $C_6^2 = 15$ types of patterns of the 16-port CSI-RS resource in the four symbols. Referring to an example of a diagram of patterns of the 16-port CSI-RS resource shown in FIG. 8b, two of 15 types are listed, and a position of one type of shadow may represent one type of pattern of the 16-port CSI-RS resource.

It is assumed that a basic pattern (2, 4) that occupies subcarriers whose numbers are 0 and 1 in FIG. 4 is a basic pattern (a), a basic pattern (2, 2) that occupies subcarriers whose numbers are 2 and 3 in FIG. 4 is a basic pattern (b), a basic pattern (2, 4) that occupies subcarriers whose numbers are 4 and 5 in FIG. 4 is a basic pattern (c), a basic pattern (2, 4) that occupies subcarriers whose numbers are 6 and 7 in FIG. 4 is a basic pattern (d), a basic pattern (2, 4) that occupies subcarriers whose numbers are 8 and 9 in FIG. 4 is a basic pattern (e), and a basic pattern (2, 4) that occupies subcarriers whose numbers are 10 and 11 in FIG. 4 is a basic pattern (f).

Figure 8B:
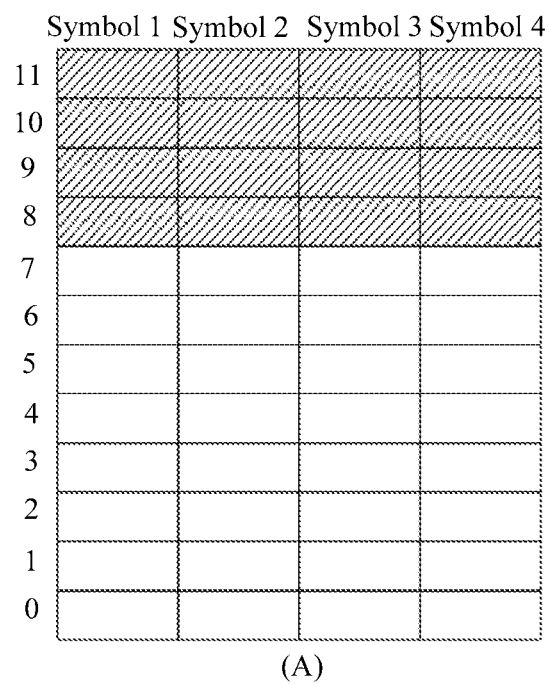
FIG. 8b is an example of a diagram of patterns of a 16-port CSI-RS resource when N=4 according to an embodiment of the present disclosure.
Figure 8B:
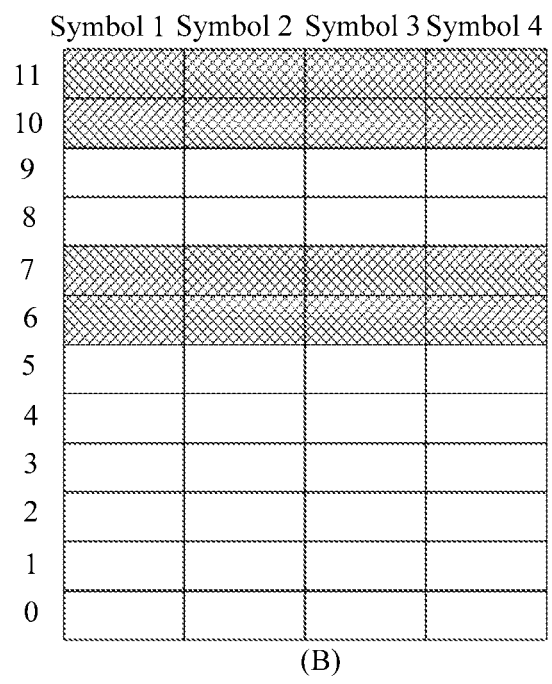

A pattern of the 16-port CSI-RS resource shown in (A) in FIG. 8b occupies four REs in time domain, and occupies four consecutive REs in frequency domain. To be specific, the pattern of the 16-port CSI-RS resource is formed by splicing a basic pattern (f) and a pattern (e) that are adjacent to each other. A pattern of the 16-port CSI-RS resource shown in (B) in FIG. 8b occupies four REs in time domain, and occupies two groups of two consecutive REs in frequency domain. To be specific, the pattern of the 16-port CSI-RS resource is formed by splicing a basic pattern (f) and a basic pattern (d) that are not adjacent to each other.

If a quantity of symbols that may be occupied by the 16-port CSI-RS resource is K, there are a total of $C_6^2 K/4 = 15K/4$ types of patterns of the 16-port CSI-RS resource in the K symbols.

32-port CSI-RS resource:

If N=4, frequency-domain splicing may be performed by using a basic pattern (2, 4). There are six positions in which the basic pattern (2, 4) may appear in one RB in four symbols. Referring to FIG. 4, a pattern of the 32-port CSI-RS resource in the four symbols may be formed by splicing any four of the six basic patterns. Therefore, there are a total of $C_6^4 = 15$ types of patterns of the 32-port CSI-RS resource in the four symbols. Referring to an example of a diagram of patterns of the 32-port CSI-RS resource shown in FIG. 9, three of 15 types are listed, and a position of one type of shadow may represent one type of pattern of the 32-port CSI-RS resource.

It is assumed that a basic pattern (2, 4) that occupies subcarriers whose numbers are 0 and 1 in FIG. 4 is a basic pattern (a), a basic pattern (2, 2) that occupies subcarriers whose numbers are 2 and 3 in FIG. 4 is a basic pattern (b), a basic pattern (2, 4) that occupies subcarriers whose numbers are 4 and 5 in FIG. 4 is a basic pattern (c), a basic pattern (2, 4) that occupies subcarriers whose numbers are 6 and 7 in FIG. 4 is a basic pattern (d), a basic pattern (2, 4) that occupies subcarriers whose numbers are 8 and 9 in FIG. 4 is set to a basic pattern (e), and a basic pattern (2, 4) that occupies subcarriers whose numbers are 10 and 11 in FIG. 4 is a basic pattern (f).

Figure 9:
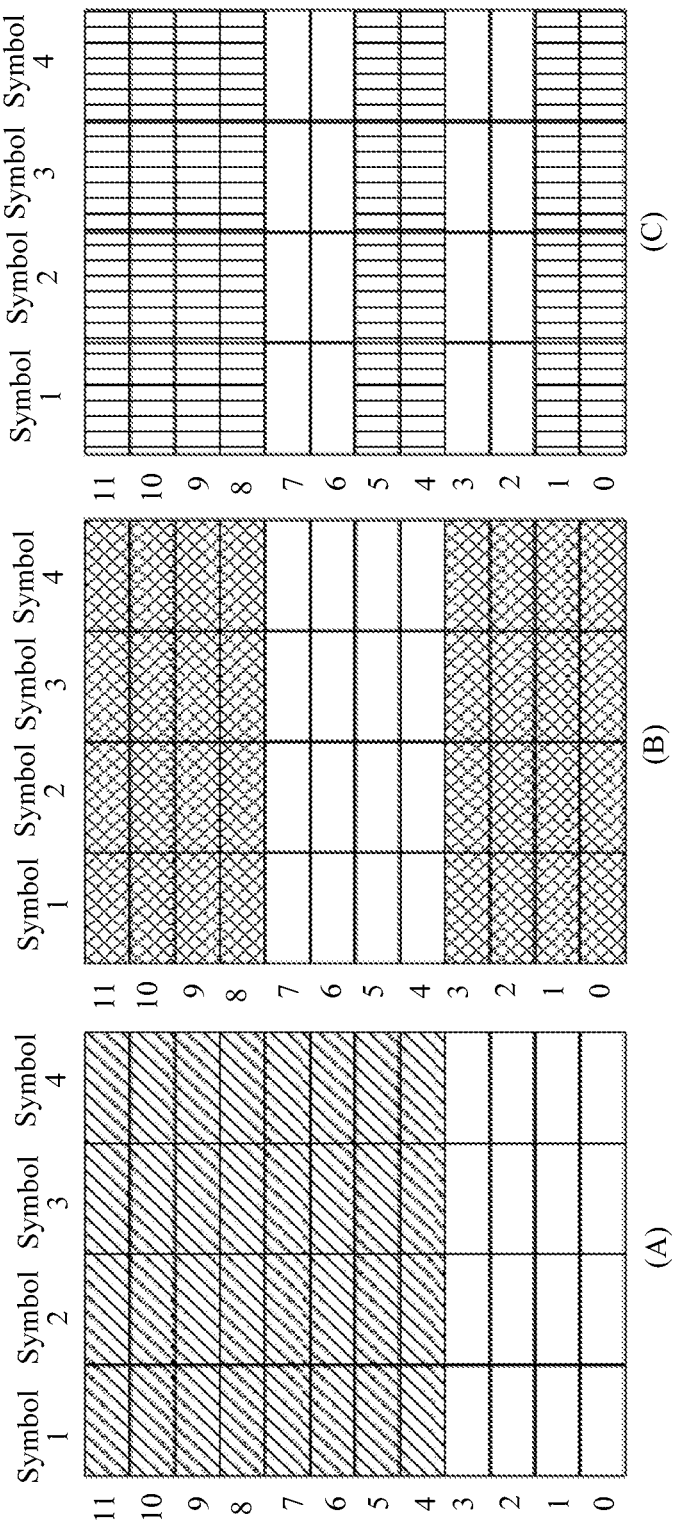
FIG. 9 is an example of a diagram of patterns of a 32-port CSI-RS resource when N=4 according to an embodiment of the present disclosure.

A pattern of the 32-port CSI-RS resource shown in (A) in FIG. 9 occupies four REs in time domain, and occupies eight consecutive REs in frequency domain. To be specific, the pattern of the 32-port CSI-RS resource is formed by splicing a basic pattern (f), a basic pattern (e), a basic pattern (d), and a basic pattern (c). A pattern of the 32-port CSI-RS resource shown in (B) in FIG. 9 occupies four REs in time domain, and occupies two groups of four consecutive REs in frequency domain. To be specific, the pattern of the 32-port CSI-RS resource is formed by splicing a basic pattern (f), a basic pattern (e), a basic pattern (b), and a basic pattern (a). A pattern of the 32-port CSI-RS resource shown in (C) in FIG. 9 occupies four REs in time domain, and occupies a group of four consecutive REs and two groups of two consecutive REs in frequency domain. To be specific, the pattern of the 32-port CSI-RS resource is formed by splicing a basic pattern (f), a basic pattern (e), a basic pattern (c), and a basic pattern (a).

If a quantity of symbols that may be occupied by the 32-port CSI-RS resource is K, there are a total of $C_6^4 K/4 = 15K/4$ types of patterns of the 32-port CSI-RS resource in the K symbols.

For a four-port CSI-RS resource, frequency-domain splicing may be performed by using a basic pattern (4, 1) or a basic pattern (2, 2). If the basic pattern (4, 1) is used, a pattern of the four-port CSI-RS resource in one symbol may be any one type of the three types of basic patterns (4, 1) shown in FIG. 4. If the basic pattern (2, 2) is used, a pattern of the four-port CSI-RS resource in two symbols may be any one type of the six types of basic patterns (2, 2) shown in FIG. 4.

The foregoing describes the method in the embodiments of the present disclosure in detail. The following describes apparatuses provided in the embodiments of the present disclosure.

Figure 10:
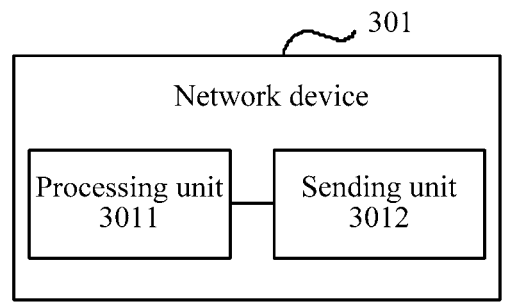
FIG. 10 is a schematic diagram of a logical structure of a network device according to an embodiment of the present disclosure.

FIG. 10 is a schematic diagram of a logical structure of a network device according to an embodiment of the present disclosure. The network device 301 may include a processing unit 3011 and a sending unit 3012.

The processing unit 3011 is configured to determine a quantity N of symbols occupied by a CSI-RS resource, where N is a positive integer, and N={1, 2, 4}.

The processing unit 3011 is further configured to obtain a pattern of the CSI-RS resource based on the quantity N of symbols.

The sending unit 3012 is configured to send configuration information corresponding to the pattern of the CSI-RS resource to a terminal device, where if N=1, the pattern of the CSI-RS resource occupies one RE in time domain, and occupies at least four consecutive REs in frequency domain; or if N=2, the pattern of the CSI-RS resource occupies two consecutive REs in time domain, and occupies at least two consecutive REs in frequency domain; or if N=4, the pattern of the CSI-RS resource occupies four consecutive REs in time domain, and occupies at least two consecutive REs in frequency domain.

The processing unit 3011 is specifically configured to: when N=1, perform frequency-domain splicing by using a first basic pattern (4, 1), to obtain the pattern of the CSI-RS resource, where the first basic pattern (4, 1) occupies one RE in time domain, and occupies four consecutive REs in frequency domain.

The processing unit 3011 is specifically configured to: when N=2, perform frequency-domain splicing by using a second basic pattern (2, 2), to obtain the pattern of the CSI-RS resource, where the second basic pattern (2, 2) occupies two consecutive REs in time domain, and occupies two consecutive REs in frequency domain.

The processing unit 3011 is specifically configured to: when N=4, perform frequency-domain splicing by using a second basic pattern (2, 4), to obtain the pattern of the CSI-RS resource, where the second basic pattern (2, 4) occupies two consecutive REs in time domain, and occupies four consecutive REs in frequency domain.

When N=1, a port quantity X of the CSI-RS resource={4, 8, 12}.

When N=2, a port quantity X of the CSI-RS resource={4, 8, 12, 16}.

When N=4, a port quantity X of the CSI-RS resource={16, 32}.

It should be noted that, the processing unit 3011 is configured to perform step S201 and step S202 in the method embodiment shown in FIG. 5, and the sending unit 3012 is configured to perform step S203 in the method embodiment shown in FIG. 5.

Figure 11:
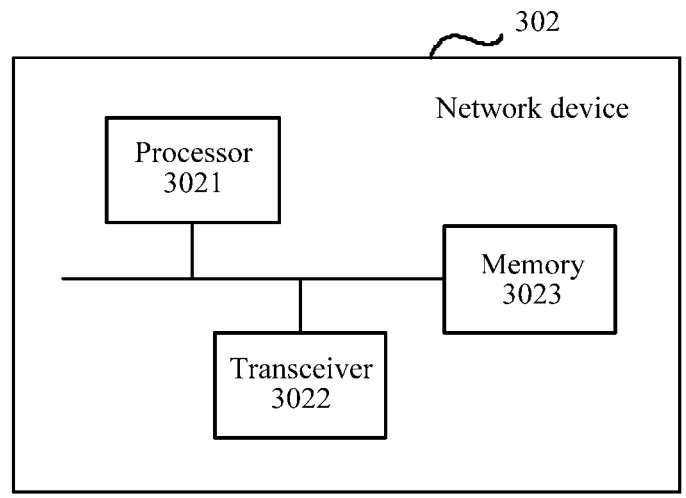
FIG. 11 is a schematic diagram of a physical structure of a network device according to an embodiment of the present disclosure.

FIG. 11 shows a network device 302 according to an embodiment of the present disclosure. The network device 302 includes a processor 3021, a transceiver 3022, and a memory 3023. The processor 3021, the memory 3023, and the transceiver 3022 are connected to each other by using a bus.

The memory 3023 includes but is not limited to a random access memory (Random Access Memory, RAM), a read-only memory (Read-Only Memory, ROM), an erasable programmable read-only memory (Erasable Programmable Read-Only Memory, EPROM), or a compact disc read-only memory (Compact Disc Read-Only Memory, CD-ROM). The memory 3023 is configured to store a related instruction and related data.

The transceiver 3022 may be a communications module or a transceiver circuit, and configured to transmit information such as data and signaling between a network device and a terminal device. Applied to this embodiment of the present disclosure, the transceiver 3022 is configured to perform step S203 in the method embodiment shown in FIG. 5.

The processor 3021 may be a controller, a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The controller/processor may implement or execute various example logical blocks, modules, and circuits described with reference to content disclosed in the embodiments of the present disclosure. The processor 3021 may be a combination of processors implementing a computing function, for example, a combination of one or more microprocessors, or a combination of the DSP and a microprocessor. Applied to this embodiment of the present disclosure, the processor 3021 is configured to perform step S201 and step S202 in the method embodiment shown in FIG. 5.

Figure 12:
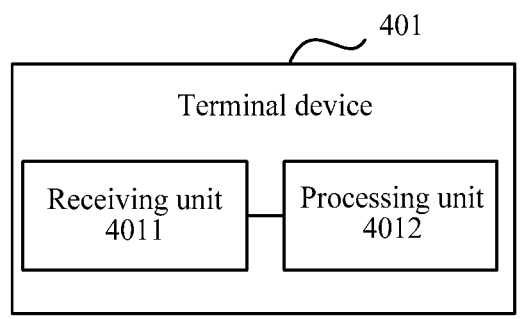
FIG. 12 is a schematic diagram of a logical structure of a terminal device according to an embodiment of the present disclosure.

FIG. 12 is a schematic diagram of a logical structure of a terminal device according to an embodiment of the present disclosure. The terminal device 401 may include a receiving unit 4011 and a processing unit 4012.

The receiving unit 4011 is configured to receive configuration information that corresponds to a pattern of a CSI-RS resource and that is sent by a network device.

The processing unit 4012 is configured to determine the pattern of the CSI-RS resource based on the configuration information.

It should be noted that, the receiving unit 4011 is configured to perform step S204 in the method embodiment shown in FIG. 5, and the processing unit 4012 is configured to perform step S205 in the method embodiment shown in FIG. 5.

Figure 13:
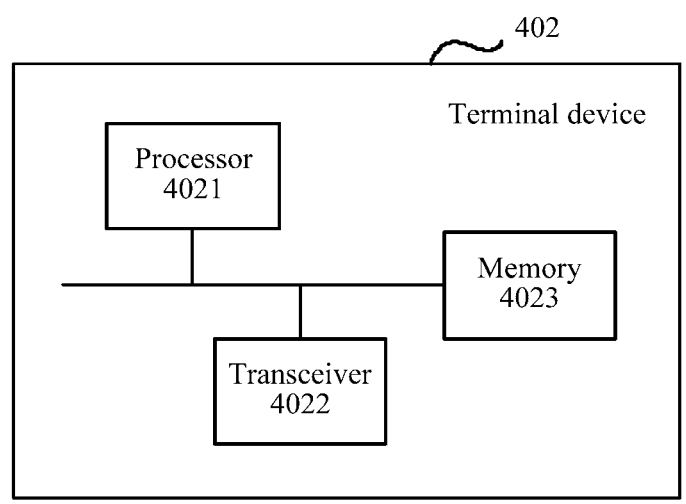
FIG. 13 is a schematic diagram of a physical structure of a terminal device according to an embodiment of the present disclosure.

FIG. 13 shows a terminal device 402 according to an embodiment of the present disclosure. The terminal device 402 includes a processor 4021, a transceiver 4022, and a memory 4023. The processor 4021, the memory 4023, and the transceiver 4022 are connected to each other by using a bus.

The memory 4023 includes but is not limited to a RAM, a ROM, an EPROM, or a CD-ROM. The memory 4023 is configured to store a related instruction and related data.

The transceiver 4022 may be a communications module or a transceiver circuit, and configured to transmit information such as data and signaling between a network device and a terminal device. Applied to this embodiment of the present disclosure, the transceiver 4022 is configured to perform step S204 in the method embodiment shown in FIG. 5.

The processor 4021 may be a controller, a CPU, a general purpose processor, a DSP, an ASIC, an FPGA, or another programmable logic device, a transistor logic device, a hardware component, or any combination thereof. The processor 4021 may implement or execute various example logical blocks, modules, and circuits described with reference to content disclosed in the embodiments of the present disclosure. The processor 4021 may be a combination implementing a computing function, for example, a combination of one or more microprocessors, or a combination of the DSP and a microprocessor. Applied to this embodiment of the present disclosure, the processor 4021 is configured to perform step S205 in the method embodiment shown in FIG. 5.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid-state disk (SSD), or the like.

What is claimed is:

1. A reference signal pattern transmission method, comprising:
    determining, by a network device, a pattern of a channel state information-reference signal (CSI-RS) resource, wherein the pattern of the CSI-RS resource corresponds to a quantity N of symbols occupied by the CSI-RS resource, wherein if N=2, and a quantity of ports of the CSI-RS resource is 16, the pattern of the CSI-RS resource occupies two consecutive resource elements (REs) in a time domain, and occupies eight REs in a frequency domain; wherein the eight REs are occupying: subcarriers 0 to 3 and 6, 7, 10, and 11; or subcarriers 0 to 5 and 10, and 11; and
    sending, by the network device, configuration information corresponding to the pattern of the CSI-RS resource to a terminal device.

2. The method according to claim 1, wherein the pattern of the CSI-RS resource is obtained by performing frequency-domain splicing by using a basic pattern (2, 2), wherein the basic pattern (2, 2) occupies two consecutive REs in the time domain, and occupies two consecutive REs in the frequency domain.

3. A reference signal pattern transmission method, comprising:
    receiving, by a terminal device, configuration information that corresponds to a pattern of a channel state information-reference signal (CSI-RS) resource and that is sent by a network device, wherein the pattern of the CSI-RS resource corresponds to a quantity N of symbols occupied by the CSI-RS resource, wherein if N=2, and a quantity of ports of the CSI-RS resource is 16, the pattern of the CSI-RS resource occupies two consecutive resource elements (REs) in a time domain, and occupies eight REs in a frequency domain; wherein the eight REs are occupying: subcarriers 0 to 3 and 6, 7, 10, and 11; or subcarriers 0 to 5 and 10, and 11; and
    performing, by the terminal device, a CSI-RS measurement based on the pattern of the CSI-RS resource that is determined based on the configuration information.

4. A network device, comprising a processor and a transceiver, wherein:
    the processor is configured to determine a pattern of a channel state information-reference signal (CSI-RS) resource, wherein the pattern of the CSI-RS resource corresponds to a quantity N of symbols occupied by the channel state information-reference signal (CSI-RS) resource, wherein if N=2, and a quantity of ports of the CSI-RS resource is 16, the pattern of the CSI-RS resource occupies two consecutive resource elements (REs) in a time domain, and occupies eight REs in a frequency domain; wherein the eight REs are occupying: subcarriers 0 to 3 and 6, 7, 10, and 11; or subcarriers 0 to 5 and 10, and 11; and
    the transceiver is configured to send configuration information corresponding to the pattern of the CSI-RS resource to a terminal device.

5. The network device according to claim 4, wherein the pattern of the CSI-RS resource is obtained by performing frequency-domain splicing by using a basic pattern (2, 2), wherein the basic pattern (2, 2) occupies two consecutive REs in the time domain, and occupies two consecutive REs in the frequency domain.

6. A terminal device, comprising a processor and a transceiver, wherein:
    the transceiver is configured to receive configuration information that corresponds to a pattern of a channel state information-reference signal (CSI-RS) resource and that is sent by a network device, wherein the pattern of the CSI-RS resource corresponds to a quantity N of symbols occupied by the CSI-RS resource, wherein if N=2, and a quantity of ports of the CSI-RS resource is 16, the pattern of the CSI-RS resource occupies two consecutive resource elements (REs) in a time domain, and occupies eight REs in a frequency domain; wherein the eight REs are occupying: subcarriers 0 to 3 and 6, 7, 10, and 11; or subcarriers 0 to 5 and 10, and 11; and the processor is configured to perform CSI-RS measurement based on the pattern of the CSI-RS resource that is determined based on the configuration information.

7. A network device, comprising:

a processing unit, configured to determine a pattern of a channel state information-reference signal (CSI-RS) resource, wherein the pattern of the CSI-RS resource corresponds to a quantity N of symbols occupied by the CSI-RS resource, wherein if N=2, and a quantity of ports of the CSI-RS resource is 16, the pattern of the CSI-RS resource occupies two consecutive resource elements (REs) in a time domain, and occupies eight REs in a frequency domain;

wherein the eight REs are occupying: subcarriers 0 to 3 and 6, 7, 10, and 11; or subcarriers 0 to 5 and 10, and 11; and a sending unit, configured to send configuration information corresponding to the pattern of the CSI-RS resource to a terminal device.

8. The network device according to claim 7, wherein the pattern of the CSI-RS resource is obtained by performing frequency-domain splicing by using a basic pattern (2, 2), wherein the basic pattern (2, 2) occupies two consecutive REs in the time domain, and occupies two consecutive REs in the frequency domain.

9. A terminal device, comprising:

a transceiver unit, configured to receive configuration information that corresponds to a pattern of a channel state information-reference signal (CSI-RS) resource and that is sent by a network device, wherein the pattern of the CSI-RS resource corresponds to a quantity N of symbols occupied by the CSI-RS resource, wherein if N=2, and a quantity of ports of the CSI-RS resource is 16, the pattern of the CSI-RS resource occupies two consecutive resource elements (REs) in a time domain, and occupies eight REs in a frequency domain; wherein the eight REs are occupying: subcarriers 0 to 3 and 6, 7, 10, and 11; or subcarriers 0 to 5 and 10, and 11; and a processing unit, configured to perform CSI-RS measurement based on the pattern of the CSI-RS resource that is determined based on the configuration information.

10. A non-transitory computer readable storage medium storing instructions that, when executed by a processor of a network device, enable the network device to perform a reference signal pattern transmission method comprising:

determining a pattern of a channel state information-reference signal (CSI-RS) resource, wherein the pattern of the CSI-RS resource corresponds to a quantity N of symbols occupied by the channel state information-reference signal (CSI-RS) resource, wherein if N=2, and a quantity of ports of the CSI-RS resource is 16, the pattern of the CSI-RS resource occupies two consecutive resource elements (REs) in a time domain, and occupies eight REs in a frequency domain; wherein the eight REs are occupying: subcarriers 0 to 3 and 6, 7, 10, and 11; or subcarriers 0 to 5 and 10, and 11; and sending configuration information corresponding to the pattern of the CSI-RS resource to a terminal device.

11. A non-transitory computer readable storage medium storing instructions that, when executed by a processor of a terminal device, enable the terminal device to perform a reference signal pattern transmission method comprising:

receiving, configuration information that corresponds to a pattern of a channel state information-reference signal (CSI-RS) resource and that is sent by a network device, wherein the pattern of the CSI-RS resource corresponds to a quantity N of symbols occupied by the CSI-RS resource, wherein if N=2, and a quantity of ports of the CSI-RS resource is 16, the pattern of the CSI-RS resource occupies two consecutive resource elements (REs) in a time domain, and occupies eight REs in a frequency domain; wherein the eight REs are occupying: subcarriers 0 to 3 and 6, 7, 10, and 11; or subcarriers 0 to 5 and 10, and 11; and performing a CSI-RS measurement based on the pattern of the CSI-RS resource that is determined based on the configuration information.

* * * * *